Feb. 5, 1957 R. J. COAR ET AL 2,780,054
CONTROL SYSTEM FOR AFTERBURNING GAS TURBINE ENGINE
Filed Nov. 18, 1950 4 Sheets-Sheet 1

FIG. 1

INVENTORS
RICHARD J. COAR
WILLIAM H. BROWN

BY Jack N. McCarthy
AGENT

INVENTORS
RICHARD J. COAR
WILLIAM H. BROWN
BY Jack N. McCarthy
AGENT

INVENTORS
RICHARD J. COAR
WILLIAM H. BROWN
BY Jack N. McCarthy
AGENT ial No. 196,425

United States Patent Office 2,780,054
Patented Feb. 5, 1957

2,780,054

CONTROL SYSTEM FOR AFTERBURNING GAS TURBINE ENGINE

Richard J. Coar, Hartford, and William H. Brown, Manchester, Conn., assignors to United Aircraft Corporation, East Hartford, Conn., a corporation of Delaware Application November 18, 1950, Ser 7 Claims. (Cl. 60—35.6)

This invention relates to a control system for a turbojet engine incorporating means for augmenting the propulsive thrust by the burning of additional fuel between the turbine and the propelling nozzle, hereafter referred to as "afterburning."

An object of this invention is to provide thrust augmentation by afterburning and to provide a simplified control for this augmentation.

Another object is the control of the afterburner by the operation of a single electrical switch.

Another object of this invention is to provide efficient operation of the engine with and without afterburning by control of the turbine rotor speed and of the propelling nozzle area.

A further object of this invention is to meter the fuel supply to the afterburner.

Another object is to automatically provide ignition for the afterburner after there is fuel flowing to the afterburner.

A further object is to automatically prevent flow of excess fuel to the combustion chamber after afterburner ignition has taken place, in the event of failure of the afterburner igniter.

Another object is to provide for control of the propelling nozzle independent of the compressor inlet conditions.

Further objects and advantages will be apparent from the following specification and drawings.

Fig. 1 is a schematic view showing a turbojet engine and afterburner in cross section with a control system.

Figure 2:
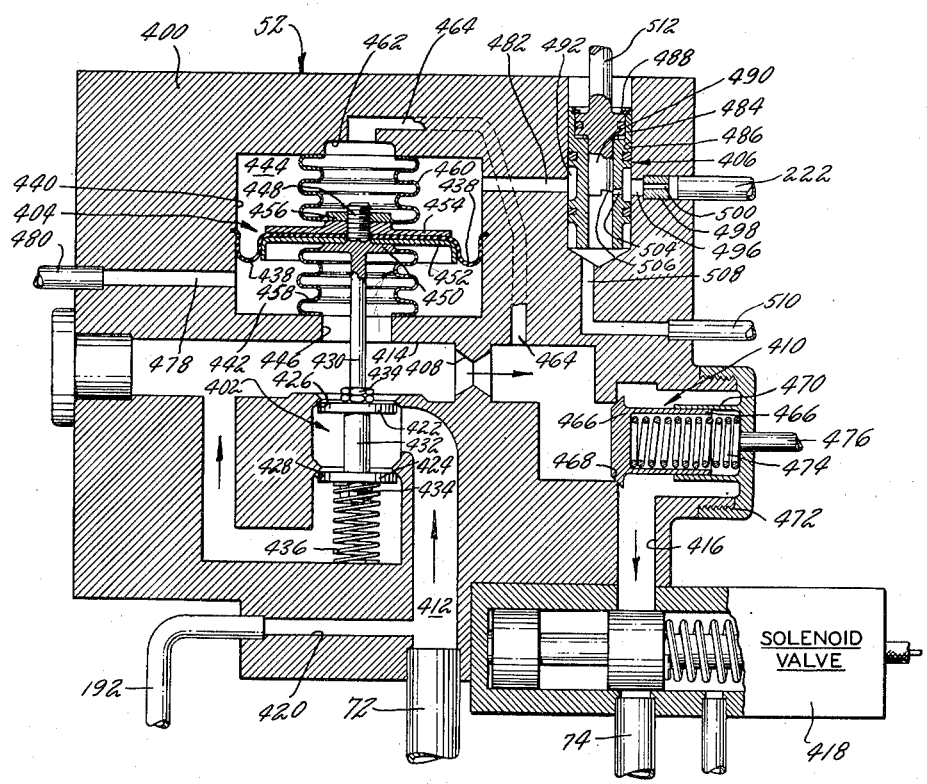
Fig. 2 is an enlarged schematic view of the fuel meter shown in Fig. 1.

The turbojet engine 2 has a compressor 4, which, in the arrangement shown, is a centrifugal type, driven by a turbine 6. Combustion chambers 8 therebetween deliver air from the compressor to the turbine. An afterburner 10 is attached at the turbine outlet to provide a means of increasing the thrust.

The engine 2 has two axially-spaced annular intake openings 12 to direct the incoming air into the two oppositely facing annular compressor inlets. Compressed air discharging from the compressor 4 passes to the turbine through the combustion chambers 8 where it is mixed with fuel from fuel nozzles 14. These fuel nozzles 14 receive fuel from the governor 15 through conduit 20. The fuel-air mixture is initially ignited within the combustion chambers 8 by a spark igniter 16. The governor 15 maintains the rotative speed of the turbine rotor assembly in accordance with the value selected by the power lever 17 by controlling fuel flow supplied through conduit 20 and nozzles 14 to the combustion chambers 8.

From the turbine, the gases pass around a cone 18 into the diffuser section 19 of the afterburner. When the afterburner is operating, fuel is discharged into these gases from a plurality of fuel nozzles 26 located in the diffuser 19. Since the gases leaving the turbine 6 contain considerable unburned oxygen, the additional fuel introduced by fuel nozzles 26 provides a combustible mixture which may be initially ignited within combustion chamber 27 by ignition means hereinafter described, which may be the type shown and claimed in the co-pending applications Serial No. 196,402, filed November 18, 1950, and Serial No. 196,426, filed November 18, 1950. The burning of this combustible mixture is stabilized in the afterburner combustion chamber 27 by flameholders 30 and 32. The burned gases discharge from the engine through the nozzle 44 whose area can be varied.

The variable nozzle 44 operates between a minimum opening for engine operation without afterburning and a maximum opening for operation of the engine with afterburning. A nozzle and actuating system, similar to the one shown with this invention, is shown and claimed in co-pending application Serial No. 193,734, filed November 2, 1950, now Patent No. 2,714,285. The actuating system consists of the cylinder 130, piston 132, connecting control rod 134, nozzle control rod 78, piston rod 138, a car 140, and a track mechanism 142 for said car.

The afterburner control system can be divided into three main parts, (1) the fuel system, (2) the ignition means and (3) the exhaust nozzle actuator control. These three parts are closely coordinated by fluid conduit connections and an electrical system.

The fuel system includes the fuel tank 46, the fuel booster pump 48, the fuel pump 50, the fuel meter 52 and the fuel nozzles 26. The fuel booster pump 48 is mounted on the fuel tank 46 and is connected to the fuel pump 50 by conduits 54 and 56. The fuel pump 50 is of the turbine type having a turbine rotor 58 mounted therein with an intake passage 60 and exhaust passages 62 for the working fluid. The working fluid, which is shown as compressed air supplied from the compressor outlet of the engine, is delivered to the intake passage 60 by conduits 230, 64 and 66. A motor operated valve 68 is located at the junction of conduits 64 and 66 to control the operation of the fuel pump by regulating the flow of compressed air to the pump. The turbine rotor 58 drives an impeller 70 which provides the pumping action. The fuel pump 50 delivers fuel to the fuel meter 52 through conduit 72. The fuel meter 52 meters the fuel therein and injects it into the engine through conduit 74 and nozzles 26. The fuel meter represented herein may be any one of many types some of which are shown and claimed in co-pending applications Serial No. 196,423, filed November 18, 1950, and Serial No. 196,414, filed November 18, 1950. This fuel meter meters fuel flow as a function of engine air flow and this fuel flow may be attenuated manually or automatically to control some engine performance variable such as turbine discharge temperature, and is a throttle type meter.

This fuel meter has a housing 400 which contains therein five main parts: a balanced metering valve 402, a metering valve controlling mechanism 404, a valve assembly 406 for attenuating the measurement of engine air flow in accordance with turbine discharge temperature, a metering orifice 408, and a back pressure valve 410. These parts are interconnected by passages and connected to other devices in the overall system to provide an operative structure. Afterburner fuel is admitted to housing 400 through passage 412 to the metering valve 402, it is metered by valve 402 into passage 414 and passed through the metering orifice 408 and back pressure valve 410 to a fuel outlet passage 416. A passage 420 provides a point at which a conduit may be connected to carry a working fluid to another device. A normally closed solenoid operated valve 418 is located between passage 416 and conduit 74.

The metering valve is merely a valve having two valve members 422 and 424. These valve members cooperate with valve seats 426 and 428. The valve members are held apart, on a valve stem 430 by a spacer 432, lock nuts 434 hold the valve members and spacer on the valve stem. This valve is biased to a closed position by spring 436.

The metering valve controlling mechanism 404 has a diaphragm 438 which has its outer edge fixed in a cavity 440 which divides said cavity into two chambers 442 and 444. The valve stem 430 extends through a hole 446 in housing 400 into chamber 442. The end of the valve stem is threaded at 448 and has a flange 450. This threaded end 448 passes through a cup 452, diaphragm 438, a washer 454, and has a nut 456 placed thereon to hold these parts together against flange 450.

A bellows 458 is fixed in chamber 442 with one end around flange 450 and the other end around the hole 446. A second bellows 460 is fixed in chamber 444 with one end around nut 456 and the other end around a recess 462 in the upper wall of chamber 444. Recess 462 is connected to the downstream side of metering orifice 408 by passage 464.

This side of the orifice is also connected with back pressure valve 410. This valve consists of a piston 466, with a valve seat 468 on one end, having slidable engagement in a cylinder 470 which is mounted on housing 400 by a threaded portion 472. A spring 474 biases said valve to a closed position, a reference pressure is directed to a chamber formed by said piston and cylinder by conduit 476.

The interior of bellows 458 is connected to the upstream side of orifice 408 through hole 446. The exterior of bellows 458 in chamber 442 and diaphragm 438 which forms one side of said chamber is connected to compressor inlet pressure by passage 478 and conduit 480. The exterior of bellows 460 in chamber 444 and diaphragm 438 which forms one side of said chamber is connected to the attenuating valve assembly by passage 482.

The attenuating valve assembly 406 has a sleeve 484 which is fixed in bore 486 of housing 400. Snap ring 488 holds valve 490 of the assembly in sleeve 484. Sleeve 484 has an annular groove 492 which connects passage 496 which has a bushing 498 with an orifice 500 to passage 482. Passage 496 is connected through conduit 222 to compressor discharge pressure. An orifice 504 connects annular groove 492 to the center of sleeve 484. The lower end of valve 490 provides the valve action by a contour 506 thereon which varies the opening presented by orifice 504. The end of sleeve 484 is connected by passage 508 and conduit 510 to compressor inlet pressure. Valve 490 is rotated by a shaft 512 to vary the restriction formed by contour 506 and orifice 504.

Figure 3:
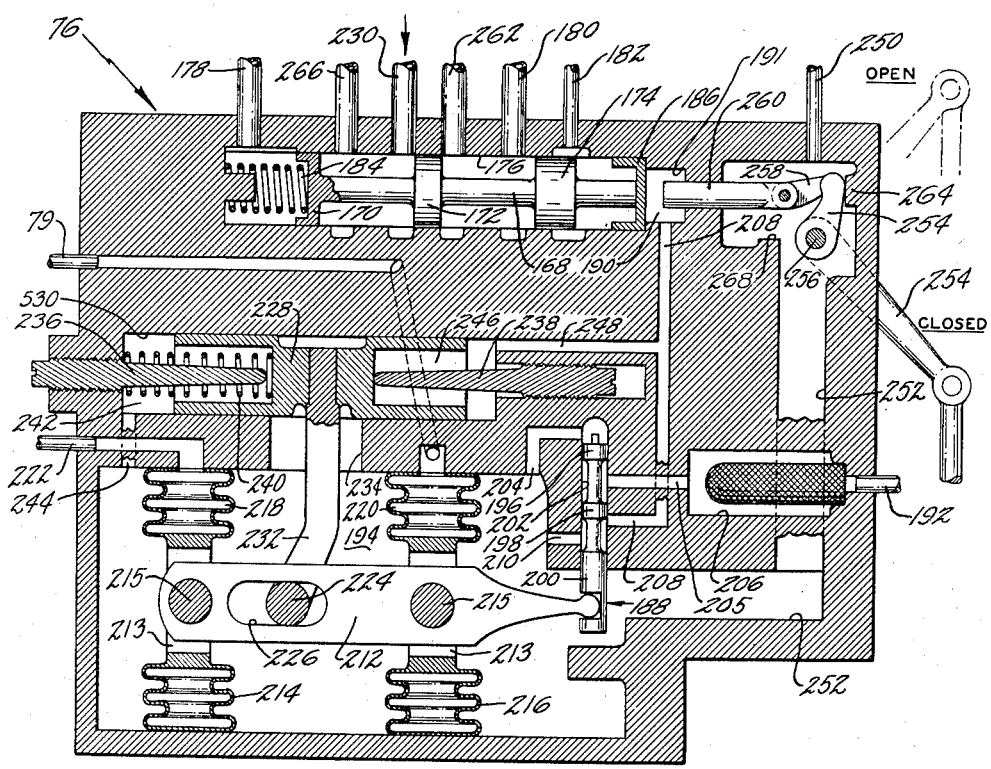
Fig. 3 is an enlarged schematic view of the exhaust nozzle actuator control shown in Fig. 1.

The exhaust nozzle actuator control 76 connects pressures to the exhaust nozzle actuating cylinders 130 by a pressure relay valve 168 either to open or to close the exhaust nozzle as required. This relay valve 168 has three lands, 170, 172 and 174 which guide the valve in its cylinder bore 176. The cylinder bore 176 has six passages connected thereto, they are from left to right in Fig. 3, a vent 178 to low pressure supply which may be compressor inlet pressure, a conduit 266 connected at its other end to the end of the cylinder 130 away from the nozzle, a conduit 230 which is connected at its other end to a high pressure supply shown as compressor discharge pressure, a conduit 262 which is connected at its other end to the end of the cylinders 130 nearest the nozzle, a vent 180 to low pressure supply, and a conduit 182 which serves as a drain. A spring 184 biases relay valve 168 to the right against one side of a piston cap 186. Piston cap 186 forms a chamber 190 with a bore 191.

A pilot valve 188 connects chamber 190 either with a line 192 which supplies a source of fluid pressure or with a chamber 194 which is connected via conduit 250 and 252 to a low reference pressure. To prevent the nozzle 44 from opening in a non-afterburning range the source of fluid pressure for line 192 is from a point in the afterburner fuel system downstream of the afterburner fuel pump. The pilot valve 188 has three lands, 196, 198 and 200, and moves axially in a cylinder bore 202. This cylinder bore has four passages connected thereto, starting from the top in Fig. 3 they are, a passage 204 which is connected at its other end to chamber 194, a passage 205 which is connected at its other end to a chamber 206 which is in turn connected to passage 192, a passage 208 which is connected at its other end to chamber 190, and a passage 210 which is connected at its other end to chamber 194.

Pilot valve 188 is connected at its lower end to one end of a walking beam 212 located in chamber 194. This walking beam 212 is connected near each end between two bellows. Each set of bellows is attached by a slotted member 213 through which the walking beam 212 passes. A pin 215 pivotally attaches the walking beam at each end to member 213 of each set of bellows. The lower bellows at each end, 214 and 216, are evacuated.

Pressures at two different stations along the flow path of the gases through the power plant are used by the control 76 to sense combustion within the afterburner and to regulate the propelling nozzle accordingly. As shown in Fig. 1, these stations are the compressor discharge pressure which is connected by conduit 222 to bellows 218, located above bellows 214, and the turbine discharge pressure which is connected by conduit 79 to bellows 220, located above bellows 216. Other stations, such as those described and claimed in co-pending application Serial No. 196,424, filed November 18, 1950, may be used.

A movable fulcrum 224 supports the walking beam 212 within a slot 226. A fulcrum shift piston 228 is located in bore 230 in control 76 above chamber 194. An arm 232 is connected at one end to the fulcrum shift piston 228 and at its other end to the fulcrum 224. The arm 232 passes through a slot 234 which connects bore 230 and chamber 194. The piston 228 can travel between two adjustment screws, a "nozzle closing" adjustment screw 236 and a "nozzle opening" adjustment screw 238. The "nozzle opening" adjustment screw 238 sets a value of the ratio of the pressures at the two different stations, which value the ratio has to exceed to open the nozzle 44 when the two pressure stations shown in Fig. 1 are used. The "nozzle closing" adjustment screw 236 sets a value of the ratio of the pressures at the two different stations which value the ratio has to drop below to close the nozzle 44 when the two pressure stations shown in Fig. 1 are used.

A spring 240 biases piston 228 to the right against the "nozzle opening" adjustment screw 238. The chamber 242 formed by the bore 230 and the left end of the piston 228 is connected to chamber 194 by passage 244. The chamber 246 formed by the bore 230 and the right end of the piston 228 is connected to passage 208 by passage 248.

A manually operated control is provided to actuate the relay valve 168 in the event the automatic functioning of nozzle control 76 fails. This manual control consists of a bell lever 254 pivoted at 256, a link 258 and an actuating rod 260. Limit stops 264 and 268 are provided. An exhaust nozzle actuator control of this type is shown and claimed in co-pending application Serial No. 196,424 filed November 18, 1950.

The igniter control 28 injects an amount of fuel in addition to that normally supplied into combustion chamber 8 where it is ignited resulting in flame propagation through the turbine into the afterburner for igniting a combustible mixture in the afterburner. Fuel is provided to the igniter control 28 from the main fuel system by conduit 80 which has a solenoid actuated shut-off valve 82 connected therein. The igniter control is connected by conduit 84 to conduit 74 which provides the actuating pressure to inject the additional fuel to provide ignition in the afterburner.

Figure 4:
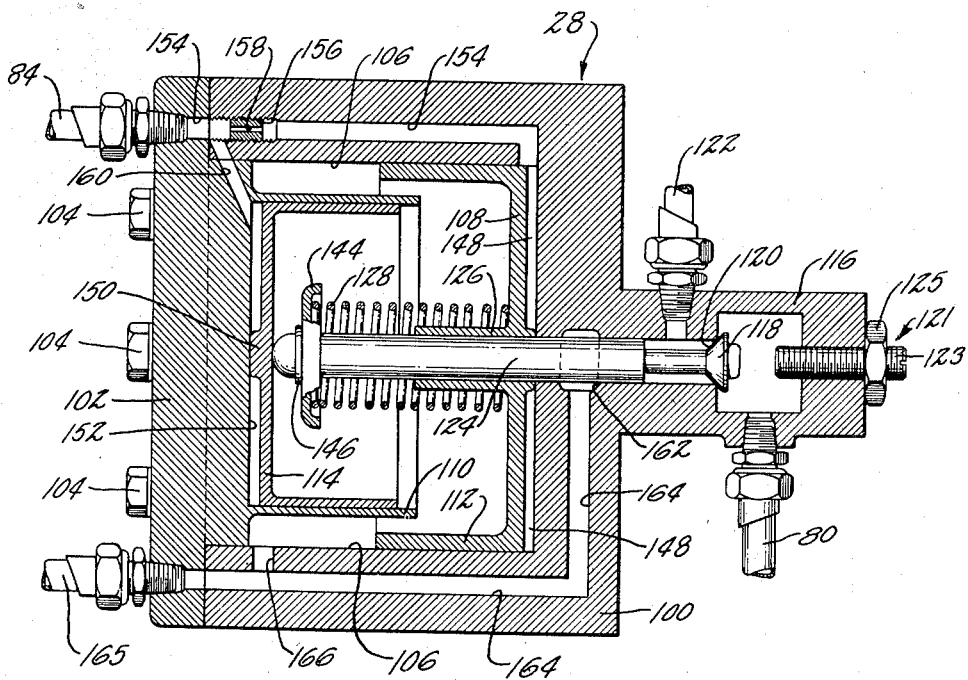
Fig. 4 is an enlarged view of the igniter control shown in Fig. 1.

The igniter control 28 (see Fig. 4) has a two part body which includes a housing 100 and a cover 102 held on the housing by bolts 104. The housing 100 has a bore 106 into which a piston member 108 fits. A cylindrical flange 110 extending from the inner side of the cover 102 projects into the housing and within a skirt 112 on piston member 108. A second piston member 114 has a slidable engagement within the circular flange 110.

A valve housing 116, attached to housing 100, contains a valve 118 controlling flow through an orifice 120 from conduit 80 to conduit 122. Housing 116 also supports an adjustable stop 121 for controlling the opening movement of said valve 118, said stop 121 consisting of a bolt 123 and lock nut 125.

A piston rod 124 extends from within housing 100 into housing 116 through a boss 126 on piston member 108. Rod 124 is made of a smaller diameter at one end and attached to valve 118. The smaller diameter permits flow past the valve. The other end is biased against piston member 114 by a spring 128 which is mounted around said rod 124 between member 108 and holding disk 144. The disk is held on said rod by a snap ring 146. Boss 126 projects on either side of piston member 108 around said rod. The part projecting on the inner side in the skirt of the piston acts as an actuating member when moving in the direction to close the valve 118. The part projecting on the outer side permits member 108 to form a chamber 148 with said housing 100 when it is against the housing. Member 114 has a projection 150 on the outer side to form a chamber 152 with the cover plate 102 when it is against the cover plate.

The igniter control has a passage 154 for connecting conduit 84 with chamber 148. A removable insert 156 having a restriction 158 is located in said passage. The duration of flow of ignition fuel is controlled by selection of the area of the restriction 158. Passage 160 connects passage 154 upstream of said insert 156 with chamber 152.

An annular groove 162 is located around the rod 124 in the wall of housing 100. This groove is connected to conduit 165 by passage 164. This venting of groove 162 prevents leakage of afterburner fuel along the rod 124 from the chamber in the igniter during afterburner operation. Passage 166 connects passage 164 to the chamber in housing 100 located between pistons 108 and 114. The chamber between the pistons is vented in this manner to prevent unintentional actuation of the igniter control by tail pipe pressure which is transmitted to chambers 148 and 152 when the afterburner is not in operation and at the same time carry away leakage from chambers 148 and 152 past pistons 108 and 114 during afterburner operation.

The electrical system may include a temperature control amplifier 86 which, during afterburner operation, is sent a signal by thermocouples 88 which sense turbine discharge temperature. Thermocouples 90 also sense turbine temperature but send their signal to temperature gage 92. This amplifier when energized sends a signal to the fuel meter 52 to attenuate fuel flow in accordance with some engine performance variable such as turbine discharge temperature and may also control the operation of a normally closed solenoid operated shut-off valve in the fuel meter 52. In the event excessive temperatures are reached at the turbine discharge the switch 93 will operate to permit the shut-off valve in the fuel meter to close. The afterburner switch 94 controls the amplifier 86, sets the motor operated valve 68, controls the fuel booster pump 48, and controls the opening of normally closed solenoid actuated shut-off valve 82. While the attenuation of fuel flow has been described as being done by automatic means it may be done manually if desired, watching gage 92 to regulate the temperature.

*Operation*

Afterburner operation is initiated by placing switch 94 in its "on" position. This movement energizes the temperature control amplifier, opens a normally closed solenoid operated shut-off valve in the afterburner fuel meter and sends a signal to the afterburner fuel meter for attenuating fuel flow therethrough. Closing of the switch also places motor operated valve 68 in open position, starts the fuel booster pump 48 and opens normally closed solenoid actuated shut-off valve 82.

The operation of the fuel booster pump forces fuel from the fuel tank 46 through conduits 54 and 56 to the impeller 70 of the fuel pump 50. The opening of the motor operated valve 68 allows compressed air to be directed from the outlet of the engine compressor 4 through conduits 230, 64 and 66 against turbine 58 to drive the impeller 70. The impeller 70 then delivers fuel to the afterburner fuel meter 52. This fuel meter 52 meters fuel as a function of compressor pressure rise and under the influence of the temperature control amplifier and this fuel passes by a normally closed solenoid shut-off valve, which is now open, through conduit 74 to the fuel nozzles 26.

The opening of the normally closed solenoid actuated shut-off valve 82 permits a source of fuel to be supplied to the igniter 28 through conduit 80. The pressure of the fuel in conduit 74 is transferred to the igniter by conduit 84 which pressure permits fuel which has passed normally closed solenoid actuated valve 82 to be injected from the igniter into a combustion chamber 8. Ignition of the injected fuel results in flame propagation through the turbine to the tail pipe resulting in ignition in the afterburner of the fuel being introduced through nozzles 26.

The ignition of fuel within the afterburner results in an increase in the ratio of turbine exhaust gas pressure relative to compressor discharge pressure, above that obtained without afterburning. Compressor discharge pressure is used as a reference to achieve a parameter which is substantially independent of compressor inlet temperature and flight velocity. The compressor discharge pressure and turbine discharge pressure are transmitted to control 76 by conduits 222 and 79. The control 76 in accordance with the change in turbine pressure ratio directs compressor discharge air from conduit 230 through conduit 262 to the side of the cylinders 130 nearest the nozzle which causes the nozzle to open. The pressure in this conduit 262 is transmitted by conduit 98 to a normally closed pressure switch 96 in the electrical line to the normally closed solenoid actuated shut-off valve 82 which opens said switch thereby closing the shut-off valve 82 preventing a flow of fuel to the igniter 28.

To stop the operation of the afterburner the afterburner switch 94 is turned to its "off" position. This turns the temperature control amplifier 86 off and turns off the supply of current to a normally closed solenoid operated shut-off valve in the fuel meter. The movement of the switch to the "off" position also closes the motor operated valve 68 and turns off the afterburner fuel booster pump 48. When the afterburner combustion ceases as a result of fuel flow cessation, or for any other reason, a decrease in the ratio of turbine exhaust gas pressure relative to compressor discharge obtains below that normally obtained. This decrease is most marked in terms of static, rather than total, turbine exhaust gas pressure and the static pressure is thus preferred for control. The decrease in turbine pressure ratio is transmitted to the exhaust nozzle actuator control thereby directing compressed air through conduit 266 from conduit 230 to the side of the cylinders 130 farthest from the nozzle which causes nozzle 44 to close. This reduction of pressure in conduit 262 is conveyed to normally closed pressure switch 96 by conduit 98 thereby permitting the switch to be closed to permit current to pass to valve 82 upon the next starting of the afterburner.

Although a specific control has been shown and described herein for purpose of illustration, it will be evident to those skilled in the art that the invention is capable of various modifications and adaptations within the scope of the appended claims.

We claim:

1. An afterburner having in combination, a variable area nozzle, a nozzle actuating mechanism to move said nozzle in an opening or closing direction, a control for said mechanism responsive to pressure in said afterburner and means operably connecting said control with said actuating mechanism, a conduit for transferring pressure in said afterburner to said nozzle control, means for supplying fuel to said afterburner including an afterburner fuel meter for metering fuel, an igniter means for igniting said fuel in the afterburner, said igniter means being responsive to the pressure of the fuel delivered to said afterburner, conduit means for transferring the pressure of the fuel delivered to said afterburner to said igniter means and means operatively connecting said igniter means and said control for rendering said igniter means inoperative when said control has opened the nozzle.

2. In combination, a gas turbine engine comprising a compressor for compressing air for use in the engine, a turbine drivingly connected to said compressor, a combustion chamber located between said compressor and turbine to which the compressed air is supplied from the compressor, fuel supply system for supplying fuel to said combustion chamber to produce a combustible fuel-air mixture with said compressed air, ignition means for igniting the fuel-air mixture in said combustion chamber, said ignition producing a hot gas, said turbine being connected to the downstream end of the combustion chamber for the flow of gas from said chamber through the turbine, and an afterburner through which gas from the turbine is discharged, said afterburner comprising a variable area nozzle, a nozzle actuating mechanism including a movable piston, control means for said mechanism responsive to pressure in said afterburner and means operably connecting said means with said actuating mechanism, said operably connecting means including a conduit connected to each side of said piston for directing an operating fluid to one side or the other of said piston, conduit means for transferring pressure in said afterburner to said control means, a fuel supply system for supplying fuel to said afterburner including an afterburner fuel meter for metering fuel, igniter means for igniting said fuel in the afterburner having a supply of fuel thereto, conduit means for supplying fuel to said igniter means, a valve in said last named conduit means, means connected with one conduit of the operably connecting means for closing said valve, said last named means including a pressure switch, said igniter means being responsive to the pressure of the fuel delivered to said afterburner, said igniter means being operative to inject fuel from said supply into the combustion chamber of said engine, and conduit means for transferring the pressure of the fuel to said afterburner to said igniter means.

3. In combination a turbojet including a compressor, a turbine, a combustion chamber located between said compressor and turbine, said turbine being connected to the downstream end of the combustion chamber for the flow of gas from said chamber, an afterburner through which gas from the turbine is discharged, a variable area nozzle on said afterburner, means for supplying fuel to said afterburner, means for igniting said afterburner, means for moving said nozzle in an opening or closing direction, said igniting means being responsive to the pressure of fuel being supplied to said afterburner for performing its igniting operation, and means responsive to said means for controlling said nozzle for preventing said igniting means from performing its igniting operation.

4. In combination a turbojet including a compressor, a turbine, a combustion chamber located between said compressor and turbine, said turbine being connected to the downstream end of the combustion chamber for the flow of gas from said chamber, an afterburner through which gas from the turbine is discharged, a variable area nozzle on said afterburner, means for supplying fuel to said afterburner, means for igniting said afterburner, means for moving said nozzle in an opening or closing direction, said igniting means including a normally closed valve, means for opening said valve to permit said igniting means to perform its igniting operation, said last named means including a normally closed pressure switch, means for closing said valve being responsive to said means for controlling said nozzle when it is moving said nozzle in an opening direction for preventing said igniting means from performing its igniting operation.

5. In combination, a gas turbine engine comprising a compressor for compressing air for use in the engine, a turbine drivingly connected to said compressor, a combustion chamber located between said compressor and turbine to which the compressed air is supplied from the compressor, fuel supply system for supplying fuel to said combustion chamber to produce a combustible fuel-air mixture with said compressed air, ignition means for igniting the fuel-air mixture in said combustion chamber, said ignition producing a hot gas, said turbine being connected to the downstream end of the combustion chamber for the flow of gas from said chamber through the turbine, and an afterburner through which gas from the turbine is discharged, said afterburner comprising a variable area nozzle, a nozzle actuating mechanism, said nozzle actuating mechanism including a movable piston, control means for said nozzle actuating mechanism for directing an operating pressure to one side or the other of said piston to either open or close said nozzle, a fuel supply system for supplying fuel to said afterburner, igniter means to provide ignition in said afterburner, said igniter means being actuated by the pressure of the fuel being supplied to said afterburner, and means responsive to said control means when it is directing an operating pressure to the side of said piston for opening said nozzle for preventing said igniter means from performing its igniting operation.

6. In combination, a gas turbine engine comprising a compressor for compressing air for use in the engine, a turbine, a combustion chamber located between said compressor and turbine to which the compressed air is supplied from the compressor, means for supplying fuel to said combustion chamber to produce a combustible fuel-air mixture with said compressed air, means for igniting the fuel-air mixture in said combustion chamber, said turbine being located downstream of the combustion chamber so that the flow of gas from said chamber passes through said turbine, an afterburner to which gas from the turbine is discharged, a variable area nozzle for controlling the exit area of said afterburner, control means for said nozzle, means for supplying fuel to said afterburner, means for igniting said fuel in the afterburner, conduit means for directing a supply of fuel to said ignition means, said ignition means being operative to inject fuel into the combustion chamber of said engine, a valve located in said conduit means, means responsive to said control means for actuating said valve.

7. In combination, a gas turbine engine comprising a compressor for compressing air for use in the engine, a turbine, a combustion chamber located between said compressor and turbine to which the compressed air is supplied from the compressor, means for supplying fuel to said combustion chamber to produce a combustible fuel-air mixture with said compressed air, means for igniting the fuel-air mixture in said combustion chamber, said turbine being located downstream of the combustion chamber so that the flow of gas from said chamber passes through said turbine, an afterburner to which gas from the turbine is discharged, a variable area nozzle for controlling the exit area of said afterburner, control means for said nozzle, means for supplying fuel to said afterburner, means for igniting said fuel in the afterburner, conduit means for directing a supply of fuel to said ignition means, said ignition means being operative to inject fuel into the combustion chamber of said engine, a valve located in said conduit means, means responsive to said control means for actuating said valve, means for supplying fuel to said afterburner.

References Cited in the file of this patent

UNITED STATES PATENTS

| | | |
|---|---|---|
| 2,402,363 | Bradbury | June 18, 1946 |
| 2,411,895 | Poole | Dec. 3, 1946 |
| 2,498,939 | Bobier | Feb. 28, 1950 |
| 2,506,611 | Neal | May 9, 1950 |
| 2,514,393 | Hutchinson | July 11, 1950 |
| 2,520,434 | Robson | Aug. 29, 1950 |
| 2,520,967 | Schmitt | Sept. 5, 1950 |
| 2,537,772 | Lundquist | Jan. 9, 1951 |
| 2,551,229 | Alford | May 1, 1951 |
| 2,640,316 | Neal | June 2, 1953 |
| 2,641,324 | Fortescue | June 9, 1953 |